United States Patent
Hosein

(10) Patent No.: US 8,005,102 B2
(45) Date of Patent: Aug. 23, 2011

(54) SYSTEM AND METHOD FOR SCHEDULING VARIABLE BIT RATE (VBR) STREAMS IN A WIRELESS COMMUNICATIONS SYSTEM

(75) Inventor: Patrick Hosein, San Diego, CA (US)

(73) Assignee: FutureWei Technologies, Inc., Plano, TX (US)

( * ) Notice: Subject to any disclaimer, the term of this patent is extended or adjusted under 35 U.S.C. 154(b) by 187 days.

(21) Appl. No.: 12/414,018

(22) Filed: Mar. 30, 2009

(65) Prior Publication Data
US 2009/0245415 A1 Oct. 1, 2009

Related U.S. Application Data

(60) Provisional application No. 61/041,121, filed on Mar. 31, 2008.

(51) Int. Cl.
*H04L 12/26* (2006.01)
*H04J 1/16* (2006.01)
*G08C 15/00* (2006.01)
*G06F 11/00* (2006.01)
*G01R 3/08* (2006.01)

(52) U.S. Cl. ........ 370/412; 370/232; 370/389; 375/295; 709/231

(58) Field of Classification Search .......... 370/232–328, 370/352–389, 411–468; 375/240–295; 709/224–231
See application file for complete search history.

(56) References Cited

U.S. PATENT DOCUMENTS

| | | | |
|---|---|---|---|
| 5,848,057 A * | 12/1998 | Lee et al. | 370/232 |
| 6,240,103 B1 * | 5/2001 | Schoenblum et al. | 370/468 |
| 6,266,323 B1 * | 7/2001 | Valko et al. | 370/230 |
| 6,477,167 B1 * | 11/2002 | Wu | 370/395.21 |
| 7,006,531 B2 * | 2/2006 | Samrao | 370/470 |
| 7,391,717 B2 * | 6/2008 | Klemets et al. | 370/216 |
| 7,623,496 B2 * | 11/2009 | Kitchin | 370/338 |
| 2005/0220118 A1 * | 10/2005 | Ma et al. | 370/395.6 |
| 2007/0025441 A1 * | 2/2007 | Ugur et al. | 375/240.03 |
| 2007/0076693 A1 * | 4/2007 | Krishnaswamy | 370/352 |
| 2008/0130511 A1 * | 6/2008 | Koo et al. | 370/252 |
| 2008/0225838 A1 * | 9/2008 | Vesma et al. | 370/375 |

FOREIGN PATENT DOCUMENTS

| | | |
|---|---|---|
| CN | 1848714 A | 10/2006 |
| CN | 1852285 A | 10/2006 |
| CN | 101102296 A | 1/2008 |
| KR | 20020087611 A | 11/2002 |

OTHER PUBLICATIONS

Hosein, P., "Broadcasting VBR Traffic in a WiMAX Network," Vehicular Technology Conference, Sep. 21-24, 2008, 5 pages, IEEE.
Hosein, P., et al., "Radio Resource Management for Broadcast Services in OFDMA-Based Networks," 2008, 5 pages, IEEE.

* cited by examiner

*Primary Examiner* — Man Phan
(74) *Attorney, Agent, or Firm* — Slater & Matsil, L.L.P.

(57) ABSTRACT

A system and method for scheduling variable bit rate (VBR) streams in a wireless communications system is provided. A method for broadcasting data includes receiving a plurality of broadcast data streams, assigning the broadcast data streams into a plurality of frames, each frame including data from no more than one of the broadcast data streams, re-allocating the plurality of frames, and causing the frames to be broadcast wirelessly. The re-allocating is based on a queue length associated with each of the broadcast data streams and an arrival rate for data of each of the broadcast data streams.

19 Claims, 5 Drawing Sheets

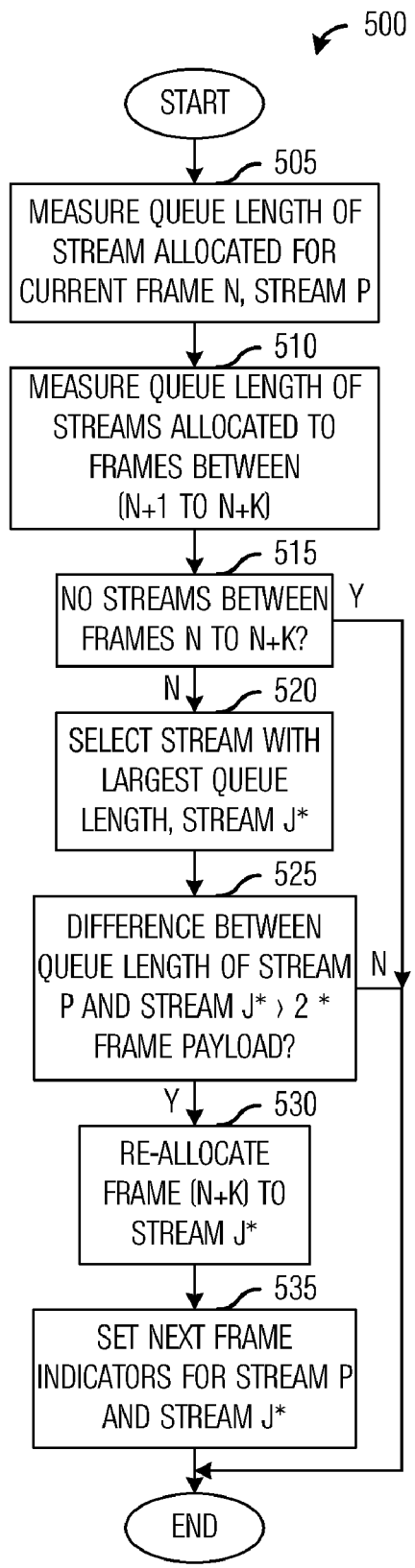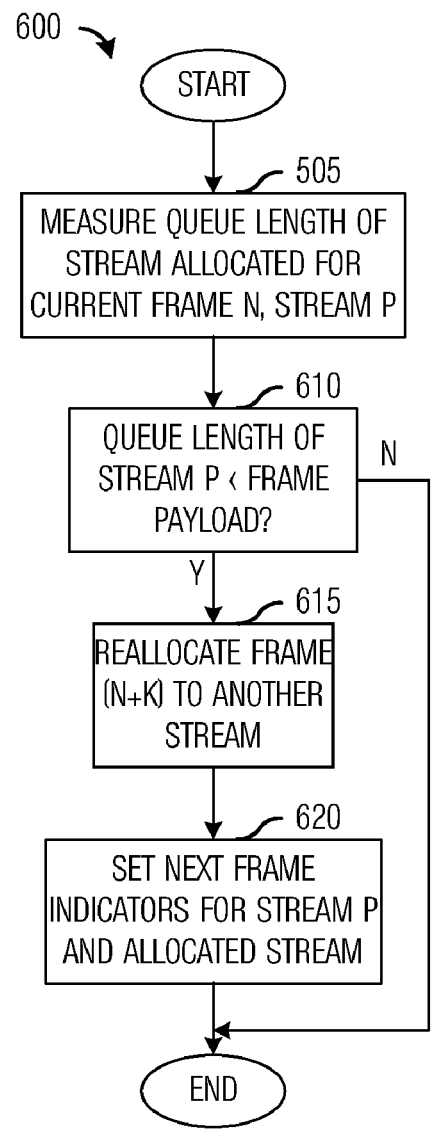
Fig. 5
Fig. 6

SYSTEM AND METHOD FOR SCHEDULING VARIABLE BIT RATE (VBR) STREAMS IN A WIRELESS COMMUNICATIONS SYSTEM

This application claims the benefit of U.S. Provisional Application No. 61/041,121, filed on Mar. 31, 2008, entitled "Method and Apparatus for Scheduling Variable Bit Rate (VBR) Streams Over an OFDMA Broadcast Channel," which application is hereby incorporated herein by reference.

CROSS-REFERENCE TO RELATED APPLICATIONS

This application is related to the following co-assigned patent application: Ser. No. 12/353,840, filed Jan. 14, 2009, entitled "Method and Apparatus for Scheduling Multimedia Streams over a Wireless Broadcast Channel," which application is hereby incorporated herein by reference.

TECHNICAL FIELD

The present invention relates generally to wireless communications, and more particularly to a system and method for scheduling variable bit rate (VBR) streams in a wireless communications system.

BACKGROUND

Broadcast services can be supported with various technologies including the traditional television broadcasts as well as newer technologies such as Digital Video Broadcasting—Handheld (DVB-H) and MediaFLO. Broadcast services can be also supported over a wireless communications system, such as a wireless communications system based on Orthogonal Frequency Division Multiple Access (OFDMA) radio transmission technology.

In providing Broadcast services in a known digital broadcast network, time slicing is usually used in which periodic bursts are allocated to each stream but the channel switching delay is high and the flexibility in multiplexing streams with different rates is limited. In providing Broadcast services in a known cellular based network, multiple streams are usually multiplexed in each transmitted burst. But this results in high terminal power usage and large signaling overhead.

SUMMARY OF THE INVENTION

These and other problems are generally solved or circumvented, and technical advantages are generally achieved, by embodiments of a system and method for dynamically assigning persistent resources in a wireless communications system.

In accordance with an embodiment, a method for broadcasting data is provided. The method includes receiving a plurality of broadcast data streams, assigning the broadcast data streams into a plurality of frames, each frame including data from no more than one of the broadcast data streams, re-allocating the plurality of frames, and causing the frames to be broadcast wirelessly. The re-allocating is based on a queue length associated with each of the broadcast data streams and an arrival rate for broadcast data of each of the broadcast data streams.

In accordance with another embodiment, a method for broadcasting data is provided. The method includes receiving a plurality of broadcast data streams, assigning the broadcast data streams into a plurality of frames, each frame including data from no more than one of the broadcast data streams, re-allocating the plurality of frames, and causing the frames to be broadcast wirelessly. The re-allocating is based on a queue length of a broadcast data stream contained in a frame used for re-allocation, and an arrival rate for data of broadcast data streams allocated to frames between the frame used for re-allocation and a next frame that will include data from that same broadcast data stream contained in the frame used for re-allocation.

In accordance with another embodiment, a method of scheduling data is provided. The method includes receiving a plurality of data streams, assigning the data streams into a plurality of frames, each frame including data from no more than one of the data streams, and re-allocating the plurality of frames. The re-allocating includes measuring a difference between a maximum queue length of a data stream contained in a frame between a first frame and a second frame and a queue length of the data stream contained in the first frame, swapping the assignment of the second frame with data stream having the maximum queue length in response to determining that the difference is greater than a threshold, and updating a next frame pointer contained in the first frame and in the second frame. The first frame is a frame being used for re-allocation, the second frame is a next frame that will include data from that same data stream contained in the first frame, and the difference includes subtracting the queue length of the data stream contained in the first frame from the maximum queue length of a data stream contained in a frame between a first frame and a second frame. The next frame pointer in a current frame indicates a succeeding frame following the current frame that contains data from that same data stream.

An advantage of an embodiment is that temporary changes in arrival rates of data streams may be compensated for without loss of data or under utilization of a channel.

A further advantage of an embodiment is re-allocation of packets to streams helps to keep queue lengths at a relatively stable level and maintains good utilization of the channel.

The foregoing has outlined rather broadly the features and technical advantages of the present invention in order that the detailed description of the embodiments that follow may be better understood. Additional features and advantages of the embodiments will be described hereinafter which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the embodiments, and the advantages thereof, reference is now made to the following descriptions taken in conjunction with the accompanying drawings, in which:

FIG. 5 is a flow diagram of scheduler operations in allocating a frame to a stream;

FIG. 6 is a flow diagram of scheduler operations in allocating a frame to a stream;

DETAILED DESCRIPTION OF ILLUSTRATIVE EMBODIMENTS

The making and using of the embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The embodiments will be described in a specific context, namely a time division duplex (TDD) OFDMA wireless communications system. The invention may also be applied, however, to other types of wireless communications systems, including those that make use of frequency division duplex (FDD), code division duplex (CDD), and so on.

Figure 1:
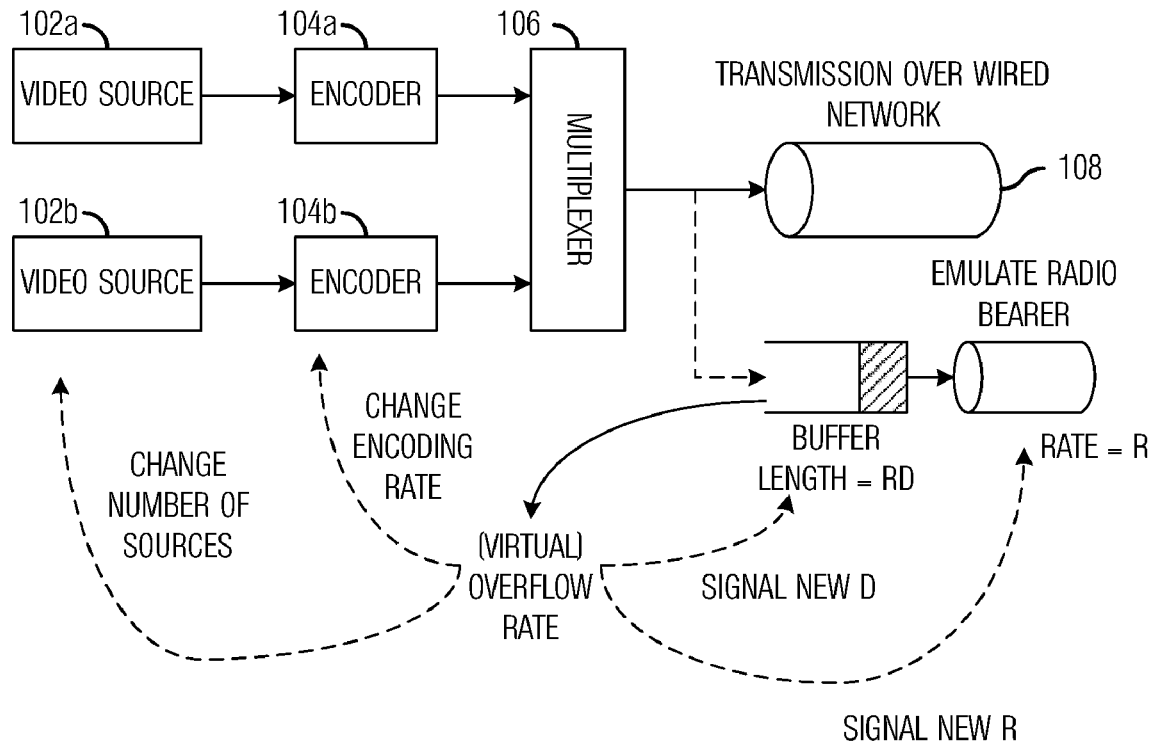
FIG. 1 is a diagram of the functionality provided by a content provider.

FIG. 1 provides a block diagram to show the functionality provided by a content provider. In this example, the content provider wishes to broadcast data from N video sources 102*a* and 102*b* (collectively 102). The video signals from sources 102 are provided to encoders 104*a* and 104*b* (collectively 104), where the data can be put into a format suitable for transmission. The encoded signals are then provided to multiplexer 106, where a single data stream is provided for transmission to a wireless service provider. In the illustrated example, the multiplexed signal is transmitted over a wired network, denoted by reference numeral 108.

In order to minimize mobile (also referred to as mobile station, terminal, user, and so forth) power usage, digital broadcast networks (such as DVB-H and MediaFLO) broadcast each stream in large periodic bursts. Each mobile needs to be awake only for the bursts of its desired channel. In OFDMA networks, such as WiMAX, the channel burst size is fixed. In order to achieve low power usage, it is optimal to serve a single channel in each broadcast burst. In addition, each frame may include an indication of an index of the next frame for the channel so that the terminal will know when next to awake (because the service times need not be periodic).

Furthermore, streams may have an average arrival rate that remains constant (or substantially constant). However, for periods of time, a stream's arrival rate may change (i.e., the stream may be bursty in nature). If the stream's arrival rate increases (decreases), a queue used to buffer packets may overflow (underrun). To optimize channel utilization, the size of the queue should remain relatively constant.

In preferred embodiments, a novel scheduling algorithm for achieving these goals is described. Advantageous features include low mobile power usage, low channel switching delay and high broadcast channel utilization.

In OFDMA, frequency (subcarrier) and time (symbol) resources are allocated to a subset of users in each frame. This allocation will typically depend on the nature of the traffic and, in the case of VoIP and data services, such as the channel conditions being experienced by the users. In the case of broadcast services, sufficient power and bandwidth resources are preferably allocated to achieve the desired coverage for the given cell site separation. The allocated resources (called a multicast/broadcast services (MBS) zone (MBS zone)) are kept constant so as not to affect resources needed for other services. Since these resources are fixed and the modulation and coding scheme is also fixed, therefore the number of bits that can be transmitted within the zone (i.e., the data payload) is also fixed.

Broadcasting can be done on a single cell basis or in a multi-cell (single frequency network) basis. In the latter case the same information is broadcast over the same time-frequency resources so that a mobile can benefit from macro-diversity gains.

Multiple streams from possibly multiple content providers may be multiplexed over the MBS zone. If data from multiple streams are included within a single frame then signaling information may be included in a MBS MAP (Mobile Application Part) message to indicate the location of the data for each of the included streams. Each terminal can then decode the portions of the frame that include data for its desired channel.

Figure 2:
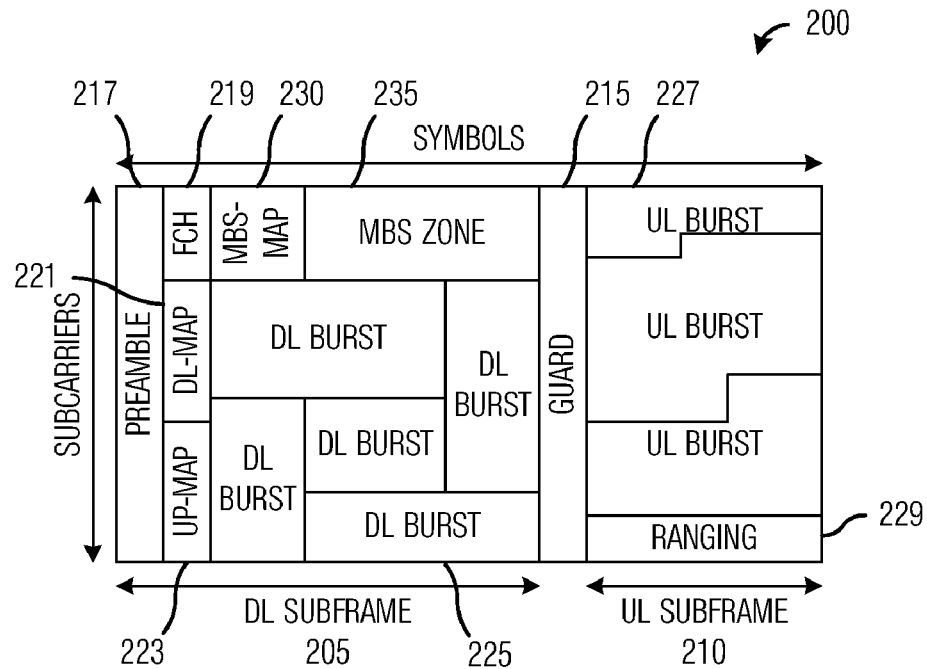
FIG. 2 is a diagram of a structure of a frame in a wireless communications system.

FIG. 2 illustrates a structure of a frame 200 in a TDD OFDMA wireless communications system. Frame 200 includes frequency resources (subcarriers) and time resources (symbols) that may be assigned for different purposes. In a TDD OFDMA wireless communications system, frames include both a downlink subframe (DL subframe 205 of frame 200, for example) and an uplink subframe (UL subframe 210 of frame 200, for example). Since the downlink subframe and the uplink subframe share common frequency resources, they are transmitted at different times to prevent interference. A transmission gap (a guard 215) separates DL subframe 205 and UL subframe 210.

DL subframe 205 includes a preamble 217 that may be used for synchronization purposes, a frame control header (FCH) 219 that may contain frame configuration parameters, a DL map 221 and a UL map 223 that may contain subchannel and symbol slot allocations for scheduled DL and UL users together with other control information, and user data bursts (for example, DL burst 225). UL subframe 210 contains user data bursts, such as UL burst 227, and a ranging field 229 that may contain data for use in synchronization operations.

DL subframe 205 also includes a MBS-MAP 230 and a MBS zone 235. MBS-MAP 230 may be used to specify physical layer parameters, such as modulation and coding scheme, location and time of burst(s) within MBS zone 235, and so forth. A mobile station may first read MBS-MAP 230 to determine the location and decoding parameters for a stream in MBS zone 235 that it is to receive, and then access and decode the information at the specified location. MBS-MAP 230 or MBS zone 235 may also include information (such as an index, an offset, a pointer, and so forth) regarding an indicator the next frame for the channel for each terminal.

One important aspect is the efficient multiplexing of multiple streams over the broadcast channel. A simple approach is simply to allocate resources for each stream in each frame. However, this has several disadvantages. Firstly each mobile will have to awaken to decode each transmitted frame even though it is interested in a small part of the frame (the stream it is decoding). Furthermore, the location of the specific time-frequency resources allocated to a stream must be signaled and so the signaling overhead increases with the number of streams multiplexed in a frame. A better approach may be to allocate one stream in each frame. This minimizes the signaling overhead and it also minimizes the number of frames that a mobile must decode because the number of frames containing its stream of interest is minimized. When battery usage is an important criterion for this type of service, the later option is preferably used. For constant rate streams, the allocation of streams to frames can simply be done in a round robin fashion.

For the more realistic case of non-homogeneous stream rates the allocation of streams to frames becomes non-trivial. In order to allow mobiles to go into sleep mode between frames containing its stream, it is necessary to indicate, in each frame, the future location of the subsequent frame for the stream. Therefore the stream to frame allocations must be deterministic. For example, a simple algorithm may allocate the stream with the largest queue size at each scheduling decision point. Since the packet arrivals are stochastic there is no way to predict when the next frame for the stream will be scheduled. Therefore, it is not possible to indicate the future location of the subsequent frame for the stream.

Given the average rate for each stream and the ability to introduce some minimal queuing, a deterministic schedule can be determined. However, such an approach may not work for streams with long term dependencies (i.e., packet losses may become unacceptable).

In order to minimize the power consumed by each mobile, a single stream is scheduled in each MBS zone. In this way, a mobile need only to be awake to decode the frames that contain information for the stream that it requires. However in order to do this the mobile must be told when next to awake. To do this, whenever a frame is transmitted the base station includes (in MBS MAP 130, for example) information about the next scheduled frame for the stream. The information may be in the form of an index, an offset, a pointer, or so on. If, for example, the frame being transmitted is frame N and the next scheduled frame for the stream is frame N+K, then MBS MAP 130 may contain a value of K. This information is then used by the mobile to awake at the correct time.

Figure 3:
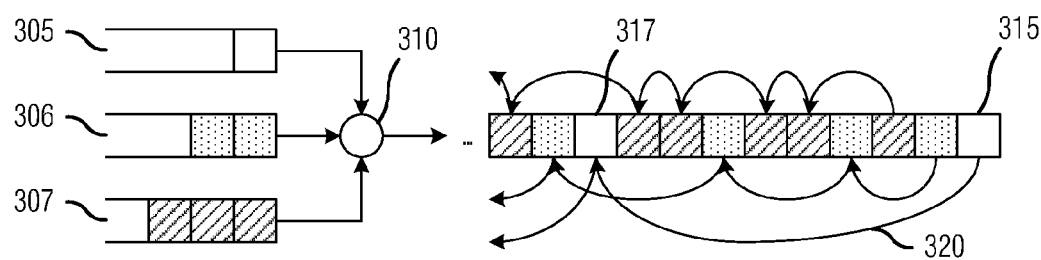
FIG. 3 is a diagram of combining packets from multiple streams into frames.

FIG. 3 illustrates a diagram of combining packets from multiple streams into frames. As shown in FIG. 3, there are three streams, stream 305, stream 306, and stream 307. A multiplexer 310 (or a combiner) combines frame sized packets from the three streams into a single stream. For example, packet 315 from stream 305 may be allocated to a frame N. Then packets from other streams may be allocated to subsequent frames. Later, packet 317 (also from stream 305) is allocated to a frame N+K. In the transmission of frame N, the MBS map of frame N may contain a value of K, indicating that the next packet from stream 305 will be transmitted in frame N+K. This is shown as arrowed line 320.

The three streams require a throughput of R, 2R, and 3R, respectively. Therefore frames must be allocated to each stream in this ratio as well. This means that a simple round robin allocation is not feasible in this case.

The following discussion describes a scheduling technique for use with constant bit rate (CBR) or near CBR streams. Assume that N streams are to be supported. If the wireless operator provides a constant bit rate pipe (i.e., a stream) of rate $r_i$ then it can use a queue of size $r_i d_i$ to achieve a maximum delay of $d_i$. Denote the frame duration by $\tau$ then a constant bit stream rate can be achieved by including $r_i \tau$ bits for stream i in each frame. This approach suffers from the fact that the mobile has to be awake for each frame to decode the relatively few bits that belong to the stream of interest. Furthermore the signaling overhead is large since the location of these bits within the zone must be indicated. From a power utilization point of view, a better approach is to include a single stream in each frame and since the terminal only has to be awake for the frames containing its stream then the power utilization is minimized.

Given the average rate of each stream, the zone size needed to support the service may be determined. Let R denote the rate of the radio bearer and $\tau$ the frame duration. The rate may be expressed as $$R = \sum_{i=1}^{N} r_i \qquad (1)$$

and hence, the zone size is equal to $R\tau$.

If all streams had the same rates then a simple round robin allocation of frames to streams will be sufficient. Each stream will be served $R\tau$ bits every N-th frame and hence achieve an average rate of R/N bps. However, in general, the rates vary among streams. If this is the case then a simple round robin scheduler will not work since some streams must be serviced more frequently than others. In addition, the time period between servicing a stream may no longer be constant. This means that the mobile would not know when next to wake up to decode its desired channel. Therefore in each frame, information regarding the location of the subsequent frame in the sequence of frames containing data from the stream must be provided to the mobile. This means that this information must be known in advance and hence the sequence of frames for a stream must be deterministic.

A scheduler that is capable of providing a constant service rate to each stream equal to the average rate of the stream is described in P. Hosein and T. Gopal, "Radio Resource Management for Broadcast Services in OFDMA-Based Networks", Proc. of IEEE ICCCWorkshop on Digital Television and Mobile Multimedia Broadcasting, Beijing, China, May 2008, which is incorporated herein by reference. The frame sequence provided by the scheduler can be determined independently by each base station or by a centralized controller and used to provide the indication for the next frame in the stream.

Define $x_i = R\tau/r_i$. Assume that at time zero all streams have sufficient queued data to fill a zone (a similar analysis can be performed for any other initial conditions). Let $S_i(k)$ denote the index of the frame that is used to transmit packet number k+1 from stream i. It can be shown that $$S_i(k) = k + i + \sum_{j=1}^{i-1} \left\lfloor \frac{kx_i}{x_j} \right\rfloor + \sum_{j=i+1}^{N} \left\lceil \frac{kx_i}{x_j} \right\rceil. \qquad (2)$$

Furthermore this sequence repeats with period given by the Lowest Common Multiple (LCM) of the set of periods $x_i$. Hence, given the average rate of each stream and the maximum delay requirements a deterministic frame allocation sequence can be determined and used to schedule streams.

However, the case of highly variable VBR video, the above buffering approach described for CBR service is not sufficient. In this case it is better to reallocate resources from those streams that do not need them to those that do (i.e., achieve multiplexing gains). However, such decisions must be made in advance since the subsequent frame for a particular stream must be signaled in the present frame.

As discussed above, assume that each stream i has some target bit rate $r_i$. However, the instantaneous bit rate varies significantly so that when the rate exceeds the average value for a sufficiently long period of time the buffer may overflow, resulting in a loss of packets, and when it falls below the average value the buffer may be depleted, resulting in a loss of system capacity.

Furthermore, assume that given the stream rates it is possible to determine the frame sequence for each stream that achieves this rate. In addition, the average queue length, $\hat{q}_i$ of stream i, is monitored using an exponentially smoothed filter as follows $$\hat{q}_i(n)=\alpha\hat{q}_i(n-1)+(1-\alpha)q_i(n), \quad (3)$$

where $q_i(n)$ is the instantaneous queue length at the n-th frame transmission and $0<\alpha<1$ is an appropriately chosen filter constant.

If the average queue length of a stream is $\hat{q}_i$ then, since the average arrival rate equals the departure rate, the expected value of the queue in the future is the same as the present value. Therefore if an additional frame of payload $R\tau$ is provided (allocated) to this stream then the expected value of its queue becomes $\hat{q}_i-R\tau$. Similarly if a frame from its sequence is taken away (unallocated) then the expected value of its queue becomes $\hat{q}_i+R\tau$. Therefore if there are two streams, i and j such that $\hat{q}_i-R\tau \geq \hat{q}_j+R\tau$ then it is possible to unallocate one frame from stream j and allocate it to stream i to help equalize their queues. If this done for all stream pairs then for any streams i and j, then $$|\hat{q}_i-\hat{q}_j|<2R\tau. \quad (4)$$

In other words, all queues within a given region are maintained. However, if the total offered load exceeds the capacity then the average queue length over all streams will increase. However with a sufficiently large number of streams, buffering and multiplexing gains will be able to accommodate such periods.

As discussed previously, the advantages of serving one stream in each frame includes minimal power utilization and minimal signaling overhead. However, another advantage is that if the frame is not used then it can be allocated to unicast traffic by the scheduler. If multiple streams were served in one frame then as long as one of the streams has data then the entire (fixed size) MBS zone must be used. This may lead to wasted resources. In order to take advantage of this full frame utilization it should be ensured that if a frame is allocated to a stream then it is fully packed otherwise it should be left empty and therefore be usable for unicast services. This is accomplished as follows. If for some stream i, $\hat{q}_i<R\tau$ at a point in time when the stream is to be served and no other streams need the resource, then the next frame in the stream's sequence is skipped. This increases, by $R\tau$, the queue length for the stream and ensures that sufficient data is available when the stream is later served. The unused frame is not wasted since it now becomes available for unicast services, for example.

The re-allocation of a frame from one stream to another stream is discussed below. The re-allocation is under the constraint that allocations must be known in advance. Suppose that the current frame is frame N and that the stream allocated to this frame, denoted by p, is next scheduled for frame N+K with frame N+M being the next frame after frame N+K that is allocated to stream p. Denote the set of streams that are served between these allocations (i.e. frames N+1, . . . , N+K−1) by S. First the stream with the largest average queue length in this set is determined $$j^* = \arg\max_{i \in S} \hat{q}_i.$$

If $\hat{q}_p \leq \hat{q}_{j^*}-2 R\tau$ then the next frame in stream p's sequence (i.e., frame N+K) may be re-allocated to stream j*. Therefore in the present frame, the indicated next frame in stream p's frame sequence as the one following frame N+K in its original sequence (frame N+M), not frame N+K. Stream j* may have one or more frames allocated to it before frame N+K. In the last of these frames before frame N+K it is indicated that the subsequent frame in the sequence is frame N+K. Additionally, a modification is made to the average queue lengths:

$$\hat{q}_p(n)=\hat{q}_p(n)+R\tau,$$

$$\hat{q}_{j^*}(n)=\hat{q}_{j^*}(n)-R\tau.$$

Figure 4A:
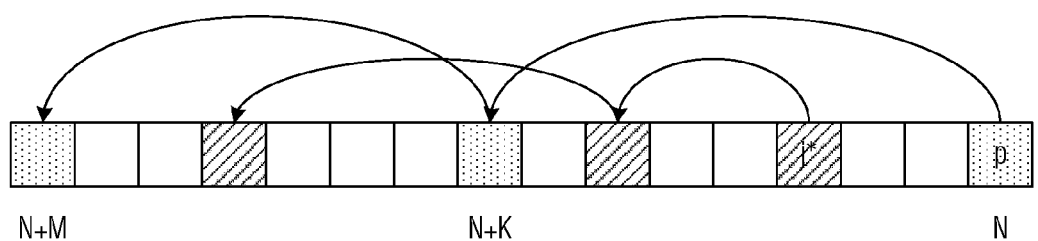
FIG. 4a is a diagram of an allocation of stream packets to frames.
Figure 4B:
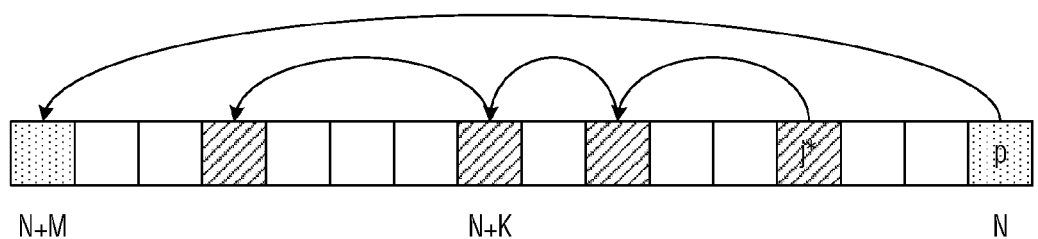
FIG. 4b is a diagram of a re-allocation of stream packets to frames.

FIG. 4a illustrates an original allocation of stream packets to frames. FIG. 4b illustrates a re-allocated allocation of stream packets to frames, showing frame N+K (originally allocated to stream p) being re-allocated to stream j*.

FIG. 5 illustrates a flow diagram for scheduler operations 500 in allocating a frame to a stream. Scheduler operations 500 may be descriptive of operations taking place in a scheduler of a base station. The scheduler may be used to allocate MBS zones of frames in an OFDMA wireless communications system to a number of streams. Scheduler operations 500 may operate continuously while there are streams to allocate.

The scheduler may begin with the scheduler receiving and buffering packets from multiple stream (block 501) and assigning frames to streams (block 502). The assigning of frames to streams may be performed so that only packets from a single stream are contained in each frame. The assigning of frames to streams may be based on average rates of each of the streams, for example.

The scheduler may continue by measuring a queue length of a stream, stream p, currently allocated to a current frame, frame N (block 505). As discussed previously, the scheduler may measure the queue length of a stream by actually monitoring the queue and using an exponentially smoothed filter. Since the stream to frame allocations is deterministic in nature, the scheduler also knows subsequent frames allocated to stream p. For example, let the next two frames allocated to stream p be frames N+K and N+M, respectively.

After measuring the queue length of stream p, the scheduler may measure the queue lengths of queues allocated to frames between the current frame (frame N) and the next frame allocated to stream p (frame N+K) (block 510). If there are no streams allocated to frames between frame N and frame N+K, i.e., K=1, (block 515) then there no re-allocations can take place for frame N and scheduler operations may terminate for frame N.

However, if there are streams allocated to frames between frame N and frame N+K, then the scheduler may select a stream having maximum queue length, let the selected stream be labeled stream j* (block 520). If there are multiple streams having the same queue length, then the scheduler may select one of the streams out of the multiple streams having the same queue length as stream j* by randomly selecting a stream, selecting a stream based on its average queue length (the largest average queue length, for example), a stream with a highest arrival rate, a stream least recently served, a stream served the least number of times between frames N and N+K, a stream having the highest priority, a stream having mobiles with the highest priority, a stream having the largest number of mobiles, and so forth.

After the scheduler selects stream j*, the scheduler may compute a difference between the queue length of stream p and stream j*. The scheduler may also compare the computed difference with a threshold (block 525). According to an embodiment, the threshold may be defined as being two times a data payload of a frame (i.e., the MBS zone of a frame). If the computed difference is greater than the threshold (with the queue length of stream p being smaller than the queue length of stream j*), then the scheduler may re-allocate frame N+K. The scheduler may re-allocate frame N+K to stream j* rather than stream p (block 530).

The scheduler may also update the next frame indicators (values in respective MBS zones) for the re-allocated frames (block 535). The next frame indicators for frame N may need to be updated to the next frame allocated to stream p, frame N+M, and the next frame indicator for a frame allocated to stream j* that is closest to frame N+K, but preceding frame N+K in time, may be updated to frame N+K. Also, the next frame indicator for frame N+K may be updated to a first frame allocated to the stream j* occurring after frame N+K. Scheduler operations 500 may then terminate for frame N.

Although the scheduler may be capable of altering allocations of frames to streams and help prevent buffer overflows or underruns, if there is a significant change in the arrival rates of a number of the streams, the capacity of the channel may be exceeded (if the arrival rates increases too much) or the capacity of the channel may be wasted (if the arrival rate decreases too much). If capacity of the channel is exceeded, packets will be loss unless at least some of the streams may be throttled, while if the capacity of the channel is wasted, the utilization of the communications system will be low unless the arrival rates of a number of the streams is increased. The scheduler may be able to signal the sources of the streams (the content providers) to increase or decrease the arrival rates to optimize the performance of the system. The signals may be provided in a feedback-like manner.

FIG. 6 illustrates a flow diagram for scheduler operations 600 in allocating a frame to a stream. Scheduler operations 600 may be descriptive of operations taking place in a scheduler of a base station. The scheduler may be used to allocate MBS zones of frames in an OFDMA wireless communications system to a number of streams. Scheduler operations 600 may operate continuously while there are streams to allocate.

The scheduler may begin with the scheduler receiving and buffering packets from multiple stream (block 601) and assigning frames to streams (block 602). The assigning of frames to streams may be performed so that only packets from a single stream are contained in each frame. The assigning of frames to streams may be based on average rates of each of the streams, for example.

The scheduler may continue by measuring a queue length of a stream, stream p, currently allocated to a current frame, frame N (block 605). As discussed previously, the scheduler may measure the queue length of a stream by actually monitoring the queue and using an exponentially smoothed filter. Since the stream to frame allocations is deterministic in nature, the scheduler also knows subsequent frames allocated to stream p. For example, let the next two frames allocated to stream p be frames N+K and N+M, respectively.

The scheduler may check to determine if the queue length of stream p is less than a data payload of a frame (i.e., the MBS zone of a frame) (block 610). If the queue length is not less than a data payload of a frame, then the scheduler may continue by performing a re-allocation of a frame to a stream, such as described previously. However, if the queue length is less than a data payload of a frame, then there may not be enough data in stream p to achieve good channel utilization, thereby decreasing system efficiency. To help improve channel utilization, the scheduler may allocate the next frame allocated to stream p (frame N+K) to another stream (block 620).

The stream selected to replace stream p (referred to herein as the allocated stream) may be a stream having a frame allocated between frame N and frame N+K. The scheduler may select one of the streams out of possible streams by randomly selecting a stream, selecting a stream with a largest queue length, selecting a stream based on its average queue length (the largest average queue length, for example), a stream least recently served, a stream served the least number of times, a stream having the highest priority, a stream having mobiles with the highest priority, a stream having the largest number of mobiles, and so forth.

The scheduler may also update the next frame indicators (values in respective MBS zones) for the re-allocated frames (block 620). The next frame indicators for frame N may need to be updated to the next frame allocated to stream p, frame N+M, and the next frame indicator for a frame allocated to the allocated stream that is closest to frame N+K, but preceding frame N+K in time, may be updated to frame N+K. Also, the next frame indicator for frame N+K may be updated to a first frame allocated to the allocated stream occurring after frame N+K. Scheduler operations 600 may then terminate for frame N.

Figure 7:
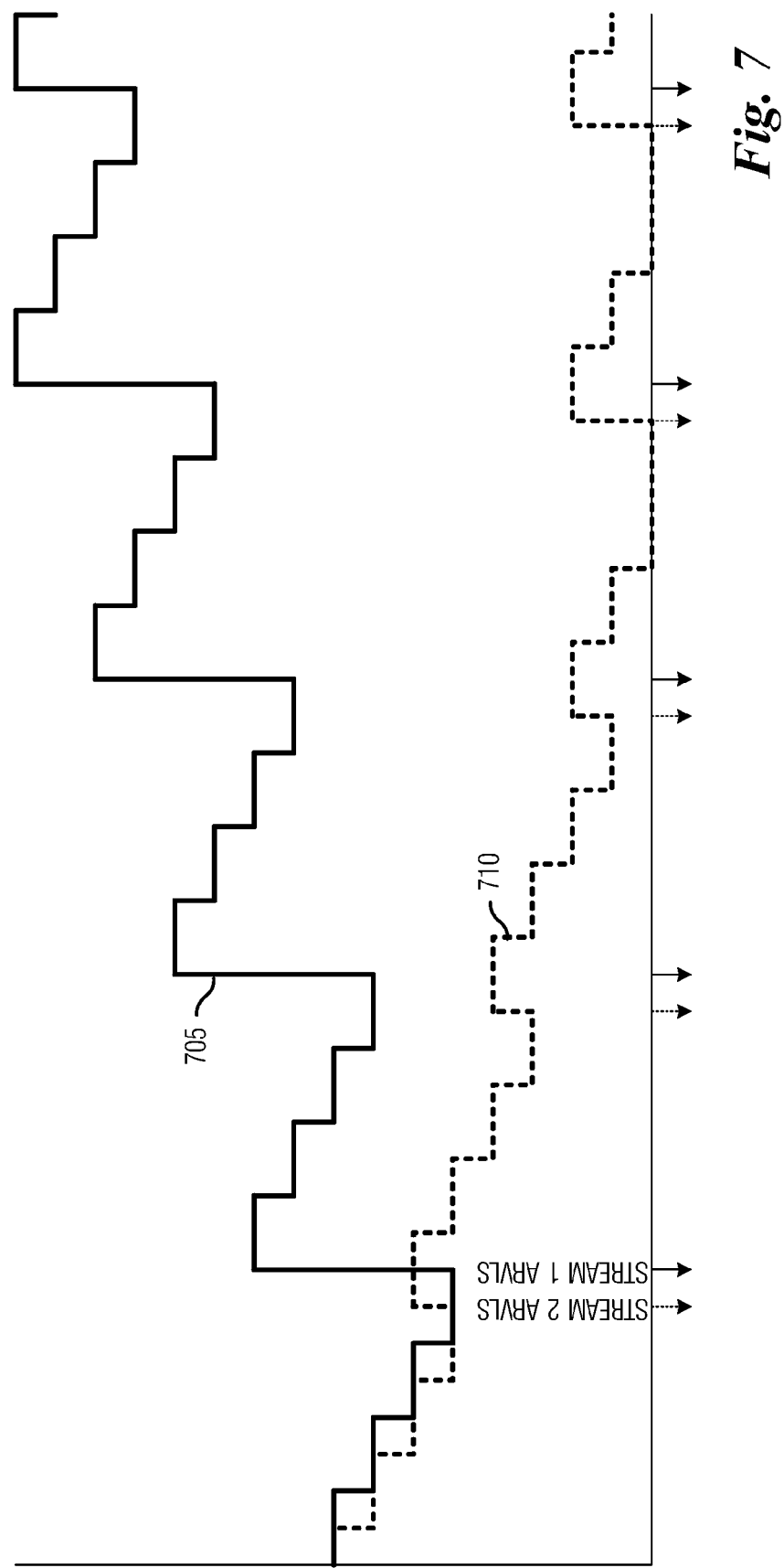
FIG. 7 is a data plot of queue length for two streams.

FIG. 7 illustrates a data plot of queue length for two streams. Queue lengths in a wireless communications system with frame duration of 5 ms and an MBS zone data payload of B bits, and two streams with video frame arrival rates of 40 ms and an average size of 4B bits were examined by simulation. However, for a period of time, video frame sizes change to 6B and 2B, respectively.

A first trace 705 represents queue length of a first stream and a second trace 710 represents queue length of a second stream. As shown in first trace 705, a serving rate of the first stream is not adequate to meet the arrival rate of packets of the first stream. Eventually, the queue length of the first stream exceeds a maximum queue length (indicating that the queue has overflowed) and packets are lost. Conversely, a serving rate of the second stream is greater than the arrival rate of packets of the second stream. Eventually, the queue length of the second stream goes to zero (indicating that the queue has underrun) and the channel becomes underutilized due to a lack of packets.

Figure 8:
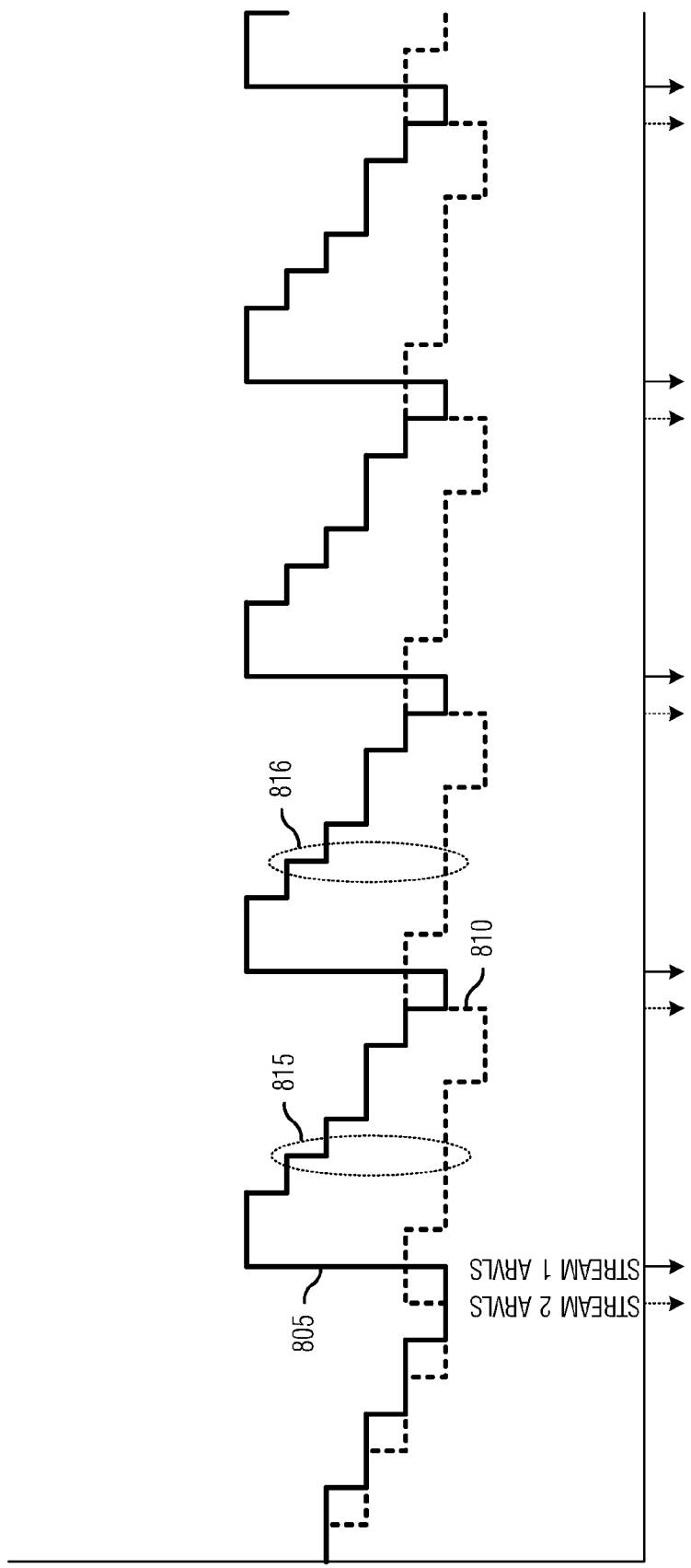
FIG. 8 is a data plot of queue length for two streams scheduled by a scheduler capable of re-allocating packets based on queue length.

FIG. 8 illustrates a data plot of queue lengths for two streams, wherein frame to stream allocations can change based on queue length. Again, queue lengths in a wireless communications system with frame duration of 5 ms and an MBS zone data payload of B bits, and two streams with video frame arrival rates of 40 ms and an average size of 4B bits were examined by simulation. However, for a period of time, video frame sizes change to 6B and 2B, respectively.

A first trace 805 represents queue length of a first stream and a second trace 810 represents queue length of a second stream. After a period of time, queue lengths of the first stream and the second stream exceed two times the data payload of a frame. At this time, a frame allocated to the second stream becomes re-allocated to the first stream (for example, shown in highlights 815 and 816), with a skipping of a transmission of a packet in the second stream being visible as an extended flat period in second trace 810 in highlights 815 and 816. Similarly, the addition of a packet in the first stream being visible as an additional step down in first trace 805 in highlights 815 and 816. As expected, with resources from the first stream being re-allocated to the second stream, both streams are able to maintain acceptable queue lengths and delays without buffer overflows or underflows. Note that, for this particular example, the frame to stream allocation makes use of the instantaneous queue length ($\hat{q}_i(n)=q_i(n)$) in which case $\alpha=0$. The queue sequence is then readily determined.

Although the embodiments and their advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for broadcasting data, the method comprising:
    receiving a plurality of broadcast data streams;
    assigning the broadcast data streams into a plurality of frames, each frame including data from no more than one of the broadcast data streams;
    re-allocating the plurality of frames, wherein the re-allocating is based on a queue length associated with each of the broadcast data streams and an arrival rate for broadcast data of each of the broadcast data streams;
    wherein a first frame is a frame being used for re-allocation, a second frame is a next frame that will include broadcast data from that same broadcast data stream contained in the first frame, a third frame is a next frame after the second frame that will include broadcast data from that same broadcast data stream contained in the first frame, and wherein the re-allocating the plurality of frames further comprises
        measuring a difference between a maximum queue length of a broadcast data stream contained in a frame between the first frame and the second frame and a queue length of the broadcast data stream contained in the first frame,
        changing the assignment of the second frame in response to determining that the difference is greater than a threshold, and
        updating information related to a next frame contained in the first frame and in the second frame; and
    causing the frames to be broadcast wirelessly.

2. The method of claim 1, wherein the information related to a next frame is a next frame pointer.

3. The method of claim 1, wherein the causing the frames to be broadcast wirelessly comprises causing the frames to be broadcast to a plurality of mobile stations, wherein a location of broadcast data within each frame is pre-specified and known by the mobile stations.

4. The method of claim 1, wherein the threshold is based on a broadcast data payload of a frame.

5. The method of claim 4, wherein the threshold is substantially equal to two times the broadcast data payload of a frame.

6. The method of claim 1, wherein the measuring a difference comprises:
    measuring the queue length of the broadcast data stream contained in the first frame;
    for each intermediate frame between the first frame and the second frame, measuring a queue length of broadcast data stream contained in the intermediate frame;
    selecting a broadcast data stream of an intermediate frame having the maximum queue length; and
    subtracting the maximum queue length from the queue length of the broadcast data stream contained in the first frame.

7. The method of claim 6, wherein there is a plurality of broadcast data streams having the maximum queue length, and wherein the selecting a broadcast data stream comprises, from the plurality of broadcast data streams, randomly selecting a broadcast data stream, selecting a broadcast data stream with a largest arrival rate, selecting a broadcast data stream contained in a fewest number of frames between the first frame and the second frame, selecting a broadcast data stream having a highest priority, selecting a broadcast data stream being transmitted to mobile stations having a highest priority, or selecting a broadcast data stream being transmitted to a largest number of mobile stations.

8. The method of claim 6, wherein the measuring a queue length comprises using an exponentially smoothed filter expressible as:

$$\hat{q}_i(n) = \alpha \hat{q}_i(n-1) + (1+\alpha) q_i(n),$$

where $q_i(n)$ is the instantaneous queue length at an n-th frame and $0 < \alpha < 1$ is a filter constant.

9. The method of claim 1, wherein the updating information comprises:
    changing information related to a next frame contained in the first frame to the third frame; and
    changing information related to a next frame contained in a frame containing the broadcast data stream having the maximum queue length closest to the second frame but preceding the second frame in time to the second frame.

10. The method of claim 9, wherein the updating information further comprises changing information related to a next frame contained in the second frame to a next frame after the second frame containing the broadcast data stream having the maximum queue length.

11. A method for broadcasting data, the method comprising:
    receiving a plurality of broadcast data streams;
    assigning the broadcast data streams into a plurality of frames, each frame including data from no more than one of the broadcast data streams;
    re-allocating the plurality of frames, wherein the re-allocating is based on a queue length of a broadcast data stream contained in a frame used for re-allocation and an arrival rate for data of broadcast data streams allocated to frames between the frame used for re-allocation and a next frame that will include data from that same broadcast data stream contained in the frame used for re-allocation, wherein the re-allocating comprises
        computing a difference between a queue length of a broadcast data stream contained in a first frame with a threshold, wherein the first frame is the frame used for re-allocation, and
        in response to determining the difference exceeds the threshold,
            re-assigning a second frame, wherein the second frame is a next frame that will include data from that same broadcast data stream contained in the first frame, and
            updating a next frame pointer in the first frame and in the second frame; and
    causing the frames to be broadcast wirelessly.

12. The method of claim 11, wherein the threshold is a broadcast data payload of a frame.

13. The method of claim 12, wherein the difference comprises the threshold minus the queue length of a broadcast data stream contained in the first threshold.

14. The method of claim 11, wherein the re-assigning a second frame comprises assigning the second frame to contain data from a first broadcast data stream, wherein the first data stream is a data stream contained in a frame between the first frame and the second frame.

15. The method of claim 11, wherein the updating comprises:
changing a next frame pointer in the first frame to point to a third frame, wherein the third frame is a next frame after the second frame that will include data from that same broadcast data stream contained in the first frame;
changing a next frame pointer in a frame containing the broadcast data stream having the maximum queue length closest to the second frame but preceding the second frame in time to point to the second frame; and
changing a next frame pointer in the second frame to point to a next frame after the second frame containing the broadcast data stream having the maximum queue length.

16. A method of scheduling data, the method comprising:
receiving a plurality of data streams;
assigning the data streams into a plurality of frames, each frame including data from no more than one of the data streams; and
re-allocating the plurality of frames, wherein the re-allocating comprises:
measuring difference between a maximum queue length of a data stream contained in a frame between a first frame and a second frame and a queue length of the data stream contained in the first frame, wherein the first frame is a frame being used for re-allocation, wherein the second frame is a next frame that will include data from that same data stream contained in the first frame, and wherein the difference comprises subtracting the queue length of the data stream contained in the first frame from the maximum queue length of a data stream contained in a frame between a first frame and a second frame,
swapping the assignment of the second frame with data stream having the maximum queue length in response to determining that the difference is greater than a threshold, and
updating a next frame pointer contained in the first frame and in the second frame, wherein the next frame pointer in a current frame indicates a succeeding frame following the current frame containing data from that same data stream.

17. The method of claim 16, further comprising providing feedback information to sources of the plurality of data streams based on the queue lengths of the data streams.

18. The method of claim 17, wherein the feedback information comprises a request to increase a data stream's arrival rate in response to determining that the data stream has a low queue length for a specified period of time.

19. The method of claim 17, wherein the feedback information comprises a request to decrease a data stream's arrival rate in response to determining that the data stream has a high queue length for a specified period of time.

* * * * *